Figure 5:
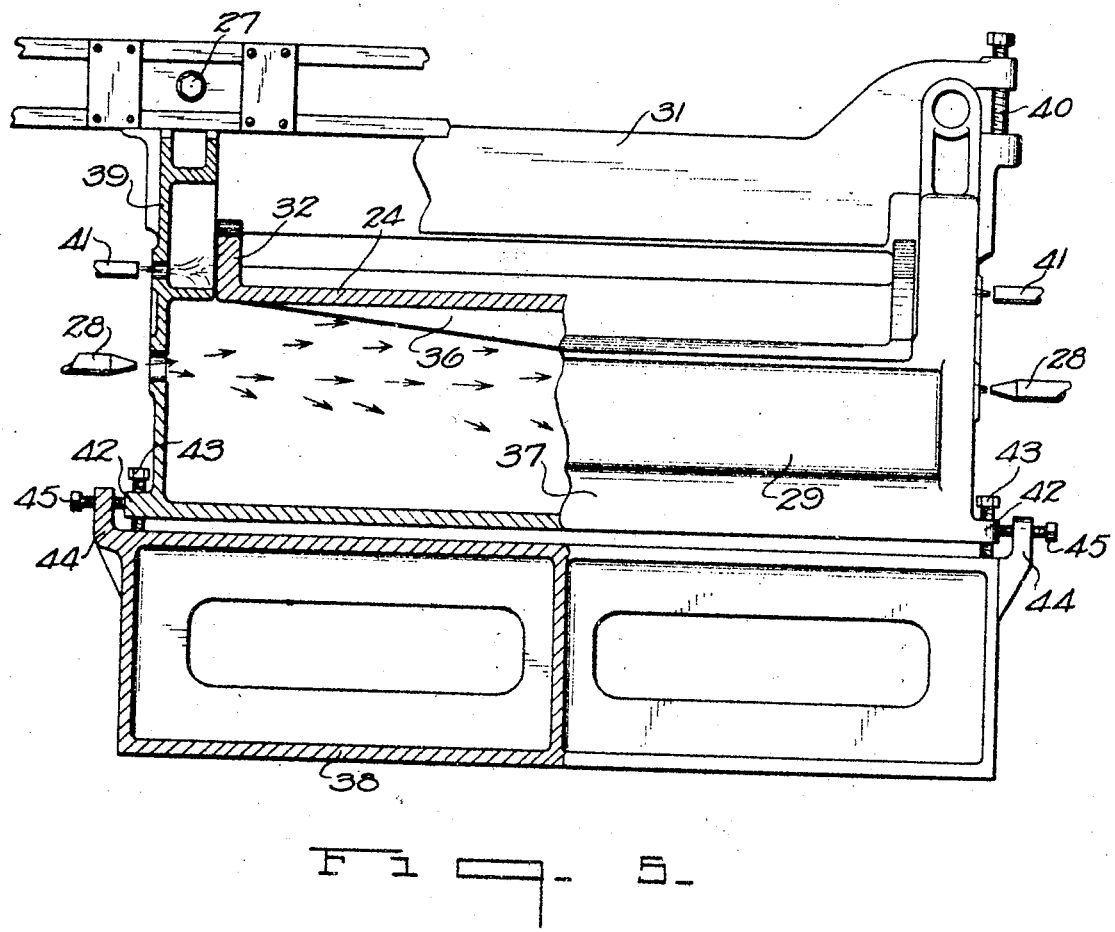

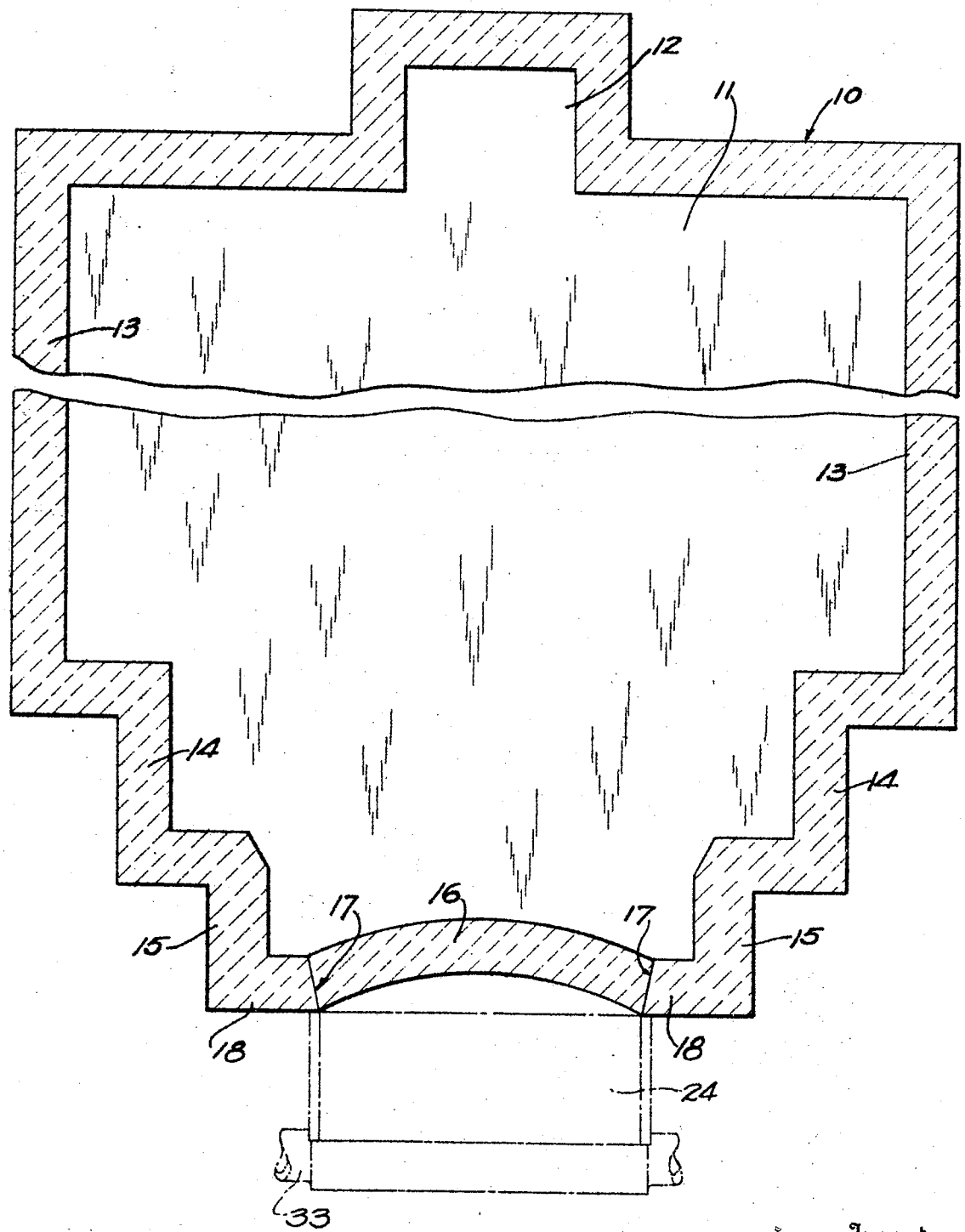

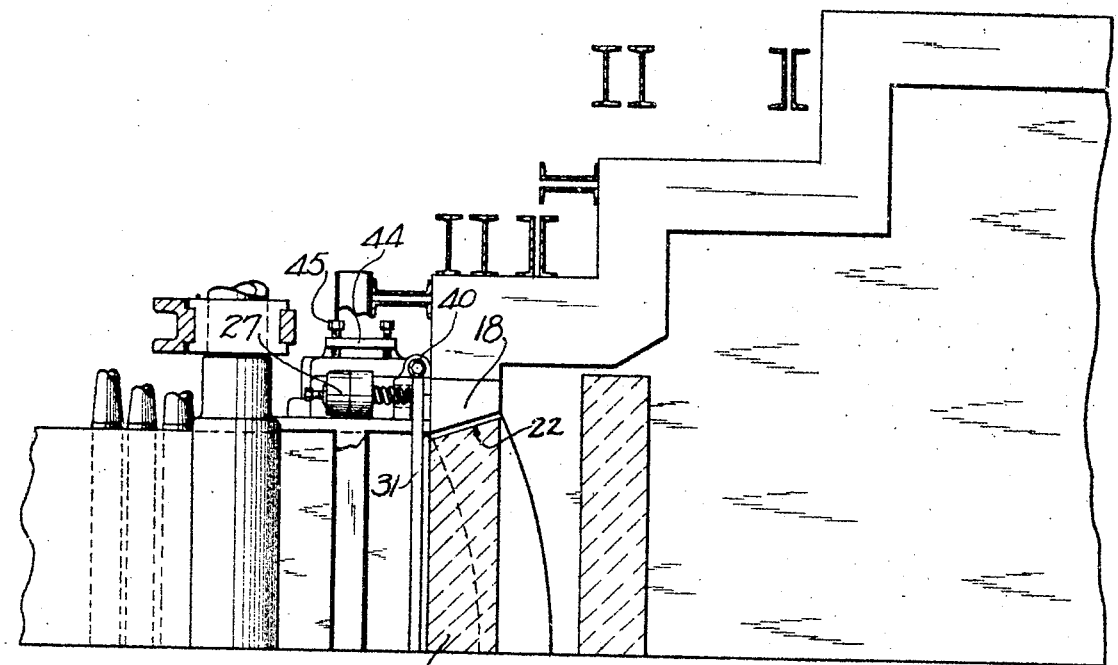
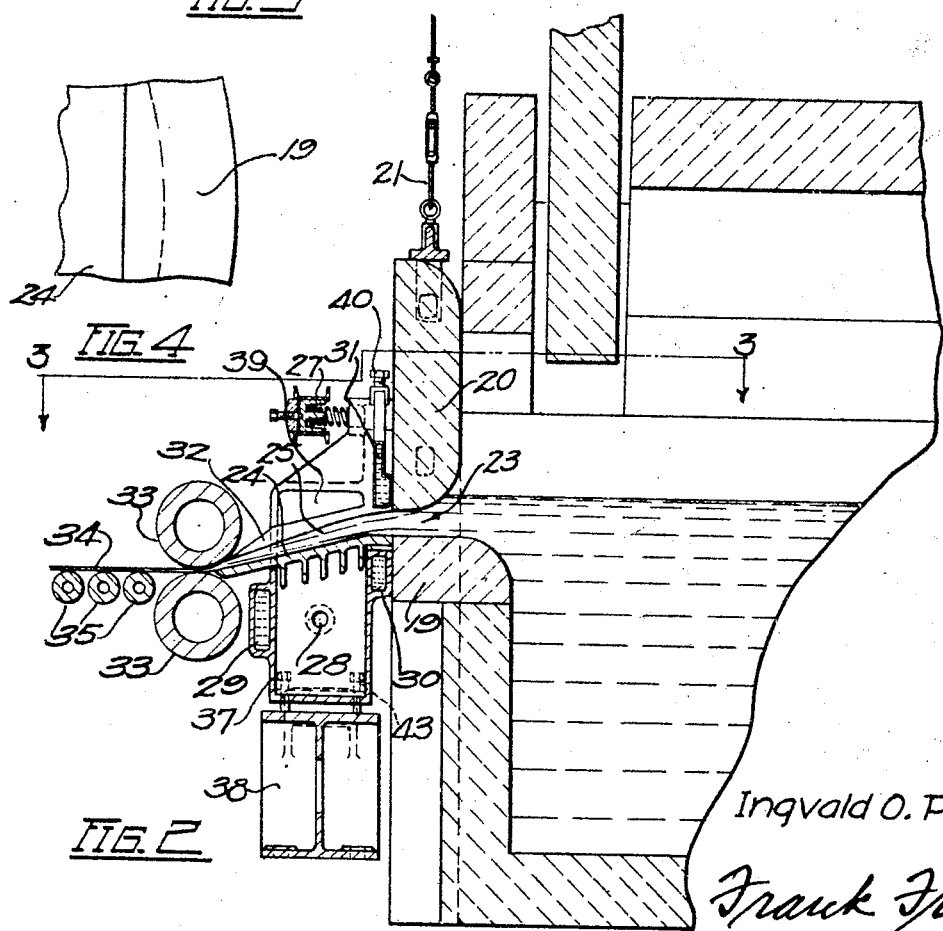

June 23, 1931.    I. O. PEDERSEN    1,810,927
SHEET GLASS APPARATUS
Filed Oct. 29, 1926    3 Sheets-Sheet 3

Inventor
Ingvald O. Pedersen.
By Frank Fraser,
Attorney

Patented June 23, 1931

1,810,927

UNITED STATES PATENT OFFICE

INGVALD O. PEDERSEN, OF PITTSBURGH, PENNSYLVANIA, ASSIGNOR TO LIBBEY-OWENS-FORD GLASS COMPANY, OF TOLEDO, OHIO, A CORPORATION OF OHIO

SHEET GLASS APPARATUS

Application filed October 29, 1926. Serial No. 144,930.

This invention relates to the production of sheet glass and has more particular reference to improved apparatus for producing a continuous ribbon of glass.

The molten glass contained within a tank furnace is not ordinarily uniform in temperature throughout the entire width of the tank as the border portions are relatively cooler than the central flow of glass. Due to this difference in temperature, the flow movement of the central portion of glass through the tank is more rapid than that of the border portions, with the result that the glass when introduced into a sheet does not have a uniform flow movement throughout its entire width. This un-uniform flow of the glass as it is introduced into the sheet causes difficulty in forming a good sheet of glass.

It is, therefore, an important object of the present invention to provide in sheet glass apparatus, an improved continuous tank furnace, wherein the stream of molten glass flowing therefrom will have a substantially uniform flow movement throughout its entire width.

Another object of the invention is to provide, in sheet glass apparatus, a continuous tank furnace of improved construction wherein the flow movement of the central portion of the molten glass will be retarded to a greater degree than will the border portions, so that when the glass is introduced into the sheet, the flow movement of the central portion of the glass will be substantially the same as the border portions.

Another object of the invention is to provide in sheet glass apparatus an improved tank furnace for supplying a continuous flow of glass to sheet forming means, said furnace including a flow block over which the stream of molten glass is adapted to flow, which block is so constructed that the central portion of the stream will contact therewith a longer period than will the border portions.

A further object of the invention is to provide, in sheet glass apparatus, an inclined runway or apron for receiving the molten glass from the flow block and conducting it to sheet forming means.

A still further object of the invention is to provide means for maintaining the glass on the inclined apron at a uniform temperature throughout the entire width thereof.

Still another object of the invention is the provision of means for adjustably supporting the inclined apron.

Other objects and advantages of the invention will become apparent during the course of the following description when taken in connection with the accompanying drawings.

In the drawings, wherein like numerals are employed to designate like parts throughout the same, Fig. 1 is a horizontal section through a continuous tank furnace constructed in accordance with the present invention, Fig. 2 is a vertical longitudinal section of the forward end of the furnace showing the sheet forming means associated therewith, Fig. 3 is a section taken on line 3—3 of Fig. 2 partially broken away, Fig. 4 is a detail top plan view of the flow block and slab, and Fig. 5 is a front view of the apparatus partially in section.

Referring now more in detail to the accompanying drawings, the numeral 10 designates a tank furnace provided in accordance with the present invention, and within which furnace is adapted to be treated the mass of molten glass 11 prior to its being introduced into the sheet.

The tank furnace 10 is provided at one end thereof with a dog house 12 wherein the batch is fed into the tank. The tank is tapered, as shown in Fig. 1, and consists of a pair of spaced side walls 13, and a second pair of adjacent more closely positioned side walls 14. Adjacent the walls 14 is a third pair of still more closely associated side walls 15. The lower front wall 16 of the tank is bowed inwardly as shown in Fig. 1, and the side edges thereof are beveled as at 17 to snugly engage the correspondingly bevelled edges of the confining walls 18. Supported upon the lower front wall 16 is a horizontal, preferably semi-circular flow block 19, widest at its center and gradually narrowing toward its opposite ends with the inner curved edge thereof being flush with the inner curved face of the front wall 16.

Supported above the flow block 19 is a shear cake 20, adjustable in any suitable manner by means of a cable 21. The lower portion of the shear cake 20 is also received between the confining walls 18, and the side edges of said shear cake are beveled as at 22 to snugly engage the correspondingly beveled edges of the said confining walls. The shear cake 20 is spaced from the flow block 19 to form an orifice 23 therebetween, and positioned forwardly of and in close proximity to the flow block 19 is an inclined apron or runway 24 provided with side or confining walls 32. The stream of molten glass 25 is adapted to flow from the tank 10, through the orifice 23, over the flow block 19 and down the inclined apron 24. It will be noted that the gate 20 has the same shape at both the top and bottom so that when it is no longer fit for use in one position, it may be reversed.

Arranged at the forward end of the apron 24 is a pair of sheet forming rolls 33, preferably internally cooled and adapted to be positively rotated so that a definite amount of glass will be passed therethrough at a predetermined speed. As the stream of glass 25 passes between the rolls 33 it is reduced to sheet form and the sheet 34 is conveyed upon rollers 35 into a suitable annealing leer wherein the sheet is gradually reduced to room temperature in a manner well known in the art.

The apron 24 is also provided upon its bottom surface with a plurality of spaced ribs 36 deepest in the center and tapering off to both sides. These ribs not only act against the tendency of the apron to warp but they also have a cooling effect on the apron. This cooling effect is greatest in the central area where the cooling should be most pronounced and this cooling action decreases gradually to either side in ratio to the tapering of the ribs. Hence, the heat is conserved at the edges where it is desired to offset possible chilling of the glass.

The apron 24 is supported upon a box 37 which is in turn carried by a suitable supporting structure 38. The side walls 39 of the box 37 extend above the apron 24 as shown in Fig. 5 and protect the molten glass on the apron from drafts, etc. The box 37 is secured in position by suitable means 27 which also acts to hold the apron 24 tightly up against the flow block 19. A gate 31 positioned outwardly of and adjacent the shear cake 20 acts as a check, by lowering it, when there is too free a flow of glass from the tank. This gate is also intended for use in cases where a temporary shutting off of the glass is desired and in such cases, air cooling may be used as the closure to freeze any glass which might leak through. In such shut downs, the inner gate or shear cake 20 may be lowered to slightly above the glass level to act as a shade wall. The gate 31 may be internally cooled by air or water or it may be solid as desired. The gate 31 is adapted to be adjusted vertically by means of suitable adjusting screws 40.

The apron supporting box 37 is provided with a water jacket 30 which is adapted to freeze any glass which might leak through the joint between the apron and flow block. Along the outer length of the apron is another water jacket 29 designed to assist the cooling of the lower roll 33. At the two sides of the supporting box are provided gas burners 41 for heating the confining walls 32 of the apron 24 to prevent cold glass forming at the sides thereof. There is also provided at each side of the box 37, beneath the apron 24, an air pipe 28 for directing air thereinto. This air cooling may be used as operating conditions warrant and in case it is found that instead of air cooling, an increase in temperature is necessary, then gas burners may be inserted.

In accordance with the present invention, provision is made for moving the apron 24 up, down, or sideways and for holding it firmly to the front of the tank. As shown, the bottom wall of the apron supporting box 37 is extended beyond the side walls thereof as at 42 and threaded through said extensions are adjusting screws 43 which rest upon the supporting structure 38. Thus, by adjusting the screws 43, the box 37 and apron 24 can be raised or lowered as desired.

The opposite ends of the supporting structure 38 are provided with up-standing flanges 44 and threaded through these flanges are adjusting screws 45 which bear against the end edges of the extensions 42 so that upon adjustment of the screws 45, the supporting box 37 and apron 24 can be moved to either side as preferred.

In the present invention, it will be appreciated that due to the particular construction of the flow block 19, the central portion of the stream of glass flowing thereover will contact with the block a greater period of time than will the border portions. Consequently, this block will act to retard the flow movement of the central portion of glass more than the border portions with the result that by the time the stream is delivered onto the apron 24, it will have a flow movement substantially uniform throughout its entire width. The fact that the stream of glass introduced into the sheet will have a substantially uniform flow movement throughout its entire width will result in the production of a better sheet of glass. The slower flow movement also affects the temperature, so that the temperature, as well as the speed of flow, is acted upon in a manner to equalize the rate of flow and the temperature of the glass throughout its entire width.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a continuous tank furnace for supplying a stream of molten glass to sheet forming means, including a bowed lower front wall, and a flow block for retarding the flow movement of the central portion of the stream more than the border portions as said stream flows from the tank.

2. In sheet glass apparatus, a continuous tank furnace for supplying a stream of molten glass to sheet forming means, including an inwardly bowed lower front wall, and a flow block supported by said wall, said block being widest at its center and gradually narrowing towards its opposite ends.

3. A tank furnace for supplying a stream of molten glass to sheet forming means, including a bowed lower front wall, confining walls for the front wall having beveled edges to snugly engage correspondingly beveled edges on said front wall, a flow block over which the glass is adapted to flow from the tank, and adjustable means received between the said confining walls for controlling the flow of glass from the tank.

4. In glass apparatus, a tank adapted to contain a mass of molten glass, a flow block over which the glass flows from said tank, an inclined apron down which the glass flows prior to being reduced to sheet form, means for adjusting said apron vertically, and means for adjusting the apron sideways.

5. In glass apparatus, a tank adapted to contain a mass of molten glass, a flow block over which the glass flows from said tank, an inclined apron down which the glass flows prior to being reduced to sheet form, and a plurality of ribs formed on said apron, said ribs being deepest at their centers and tapering towards their opposite ends.

6. In glass apparatus, a tank adapted to contain a mass of molten glass, a flow block over which the glass flows from said tank, an inclined apron down which the glass flows prior to being reduced to sheet form, and a plurality of tapering ribs formed on said apron.

7. In glass apparatus, a tank adapted to contain a mass of molten glass and having an outlet orifice in the wall thereof, an inclined apron associated with said orifice for receiving a stream of molten glass therefrom, means for receiving the glass from said apron and reducing it to sheet form, and a plurality of spaced ribs formed on the bottom of said apron and extending transversely thereof, said ribs being deepest at their centers and tapering toward their opposite ends.

8. In glass apparatus, a tank adapted to contain a mass of molten glass and having an outlet orifice in the wall thereof, an apron associated with said orifice for receiving a stream of molten glass therefrom, means for receiving the glass from said apron and reducing it to sheet form, means for separately adjusting the opposite sides of said apron vertically, and means for adjusting the apron sideways.

9. In glass apparatus, a tank adapted to contain a mass of molten glass and having an outlet orifice in the wall thereof, an apron associated with said orifice for receiving a stream of molten glass therefrom, means for receiving the glass from said apron and reducing it to sheet form, and means for supporting the apron, said supporting means extending upwardly above said apron at the sides thereof to protect the glass thereon from drafts.

10. In glass apparatus, a tank adapted to contain a mass of molten glass and having an outlet orifice in the wall thereof, an apron associated with said orifice for receiving a stream of molten glass therefrom and being provided with substantial vertical side walls, means for receiving the glass from said apron and reducing it to sheet form, means for heating the side walls of said apron, and means for supporting the apron, said supporting means extending upwardly beyond the side walls of said apron to protect the glass upon said apron from drafts.

11. In glass apparatus, a tank adapted to contain a mass of molten glass and having an outlet orifice in the wall thereof, an apron associated with said orifice for receiving a stream of molten glass therefrom and being provided with substantially vertical side walls, means for receiving the glass from said apron and reducing it to sheet form, means for supporting said apron, the side walls of said supporting means extending upwardly beyond the side walls of the apron, and means outwardly of said supporting means for directing a flame against the side walls of the apron.

12. In glass apparatus, a tank furnace adapted to contain a mass of molten glass, including a lower front wall, confining walls for the front wall extending upwardly thereabove, and a vertically adjustable gate arranged between the confining walls above the lower front wall and cooperating therewith to form an outlet orifice in the wall of the furnace.

13. In glass apparatus, a tank furnace adapted to contain a mass of molten glass, including a lower front wall having bevelled side edges, confining walls for the front wall having bevelled edges to snugly engage the correspondingly bevelled edges of said front wall, the confining walls extending upwardly above said lower front wall, and a vertically adjustable gate arranged between the confining walls above the lower front wall and having bevelled edges arranged to engage the correspondingly bevelled edges thereof, said gate cooperating with the lower front wall to form an outlet orifice in the wall of the furnace.

14. In glass apparatus, a tank furnace for supplying a stream of molten glass to sheet forming means, including an inwardly bowed lower front wall, and a flow block supported by said wall and over which the stream of glass is adapted to flow, said flow block having a substantially flat front face and a longitudinally curved rear face arranged flush with the inner face of the lower front wall.

Signed at Toledo, in the county of Lucas and State of Ohio, this 18th day of Oct., 1926.

INGVALD O. PEDERSEN.